United States Patent
Li

(10) Patent No.: US 8,919,809 B2
(45) Date of Patent: Dec. 30, 2014

(54) CHILD STROLLER AND STROLLER FRAME THEREOF

(71) Applicant: Dao-Chang Li, Guangdong (CN)

(72) Inventor: Dao-Chang Li, Guangdong (CN)

(73) Assignee: Wonderland Nurserygoods Company Limited, Kwai Chung, N.T. (HK)

( * ) Notice: Subject to any disclaimer, the term of this patent is extended or adjusted under 35 U.S.C. 154(b) by 0 days.

(21) Appl. No.: 13/769,843

(22) Filed: Feb. 19, 2013

(65) Prior Publication Data

US 2013/0257022 A1    Oct. 3, 2013

(30) Foreign Application Priority Data

Mar. 28, 2012 (CN) .......................... 2012 1 0086465

(51) Int. Cl.
*B62B 1/00* (2006.01)
*B62B 9/12* (2006.01)

(52) U.S. Cl.
CPC ........................................ *B62B 9/12* (2013.01)
USPC ............ 280/658; 280/642; 280/649; 280/650

(58) Field of Classification Search
CPC ....................................................... B62B 1/00
USPC ......... 280/648, 650, 649, 642, 47.38, 30, 658
See application file for complete search history.

(56) References Cited

U.S. PATENT DOCUMENTS

| 5,499,831 | A | * | 3/1996 | Worth et al. ..................... 280/30 |
| 5,676,386 | A | | 10/1997 | Huang |
| 5,772,279 | A | * | 6/1998 | Johnson, Jr. ..................... 280/30 |
| 6,478,327 | B1 | * | 11/2002 | Hartenstine et al. .......... 280/642 |
| 6,572,134 | B2 | * | 6/2003 | Barrett et al. .................. 280/650 |
| 6,802,514 | B2 | * | 10/2004 | Worth et al. ..................... 280/30 |
| 7,513,512 | B2 | * | 4/2009 | Yoshie et al. ............... 280/47.38 |
| 7,600,775 | B2 | * | 10/2009 | Chen et al. ..................... 280/650 |
| 7,694,996 | B2 | * | 4/2010 | Saville et al. ................. 280/642 |
| 8,172,253 | B2 | * | 5/2012 | Song ............................. 280/642 |
| 8,240,700 | B2 | * | 8/2012 | Greger et al. ................. 280/648 |
| 8,458,880 | B2 | * | 6/2013 | Fiore, Jr. ....................... 280/648 |
| 2004/0094922 | A1 | | 5/2004 | Eros |
| 2008/0029980 | A1 | * | 2/2008 | Dotsey et al. ................ 280/47.4 |
| 2010/0044985 | A1 | * | 2/2010 | Fiore, Jr. .................... 280/47.38 |

FOREIGN PATENT DOCUMENTS

| CN | 200948756 Y | 9/2007 |
| CN | 201501429 U | 6/2010 |
| CN | 101767603 A | 7/2010 |
| DE | 200 02 027 U1 | 3/2000 |
| GB | 2482070 A | 1/2012 |

* cited by examiner

*Primary Examiner* — Hau Phan
(74) *Attorney, Agent, or Firm* — Winston Hsu; Scott Margo

(57) ABSTRACT

A child stroller and a stroller frame thereof are disclosed. The child stroller includes the stroller frame and a child safety seat. The child safety seat is engaged with the stroller frame in a detachable way. The stroller frame includes a main frame and an engaging device disposed on the main frame. The child safety seat includes a front engagement mechanism and a rear structural part. The front engagement mechanism is engaged with a front handrail support of the main frame. A hook of the engaging device hooks the rear structural part. Therefore, in practice, parents can take the child safety seat together with the child sitting thereon from a car onto the stroller frame, which reduces the probability of waking the child up and the inconvenience of the parents.

17 Claims, 16 Drawing Sheets

US 8,919,809 B2

1

CHILD STROLLER AND STROLLER FRAME THEREOF

BACKGROUND OF THE INVENTION

1. Field of the Invention

The invention relates to a child stroller, and especially relates to a stroller frame capable of being engaged with a child safety seat and a child stroller therewith.

2. Description of the Prior Art

A seat of a common child stroller is usually mounted on a stroller frame. In practice, if parents need to move a child to a child stroller, they are required to carry the child up from some place else and move the child onto a seat. When the child, especially an infant is deeply asleep on a child safety seat, carrying the child up usually wakes the child up, leading to the inconvenience of the parents. In addition, when going out by car, a child stroller prepared for single using occupies much space of the trunk. Especially for a stroller for infant, the volume thereof is usually larger than that of a common child stroller, so the stroller for infant occupies more space, which causes more inconvenience of the parents.

SUMMARY OF THE INVENTION

An objective of the invention is to provide a stroller frame capable of being engaged with a child safety seat. In practice, the child safety seat together with the child sitting on the child safety seat can be moved from a rear seat of a car to the stroller frame, reducing the probability of waking the child up and the inconvenience of parents.

The stroller frame of the invention is capable of being engaged with a child safety seat. The child safety seat includes a rear structural part. The stroller frame includes a main frame and an engaging device. The main frame includes a front handrail support. The engaging device is disposed on the main frame. When the child safety seat is placed on the stroller frame, the front handrail support supports the child safety seat and the engaging device is engaged with the rear structural part. In practice, the stroller frame can be engaged with a common child safety seat to form a child stroller. Therefore, if a movement of a child sitting on the child safety seat is required, the child together with the child safety seat can be moved onto the stroller frame, reducing the probability of waking the child up and the inconvenience of parents.

Another objective of the invention is to provide a child stroller having the stroller frame of the invention. The child stroller includes a stroller frame. The stroller frame includes a main frame and an engaging device. The main frame includes a front handrail support. The engaging device is disposed on the main frame. The engaging device includes a hook. The stroller frame is capable of supporting and engaging with a child carrier in a detachable way. Therein, the front handrail support supports the child carrier, and the hook hooks the child carrier. Therefore, the child carrier such as a child safety seat can still be departed from the stroller frame and moved to a rear seat of a car as a common child safety seat. In practice, the child together with the child safety seat can be moved onto the stroller frame, reducing the probability of waking the child up and the inconvenience of parents. The child safety seat engaged with the stroller frame can form the child stroller, which facilitates movement of the child stroller by the parents.

Compared with the prior art, the invention provides a stroller frame capable of being engaged with a child safety seat or other child carrier, so that when a child sitting on a child safety seat is to be moved, it is applicable to move the child together with the child safety seat onto the stroller frame, which reduces the probability of waking the child up and solves the problem in the prior art that carrying the child up for the movement of the child usually wakes the child up. Furthermore, the child safety seat engaged with the stroller frame can form the child stroller of the invention, which facilitates movement of the child stroller by the parents and enhances the use of the child safety seat so as to save the expenses of buying a child safety seat and a child stroller respectively for the parents.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
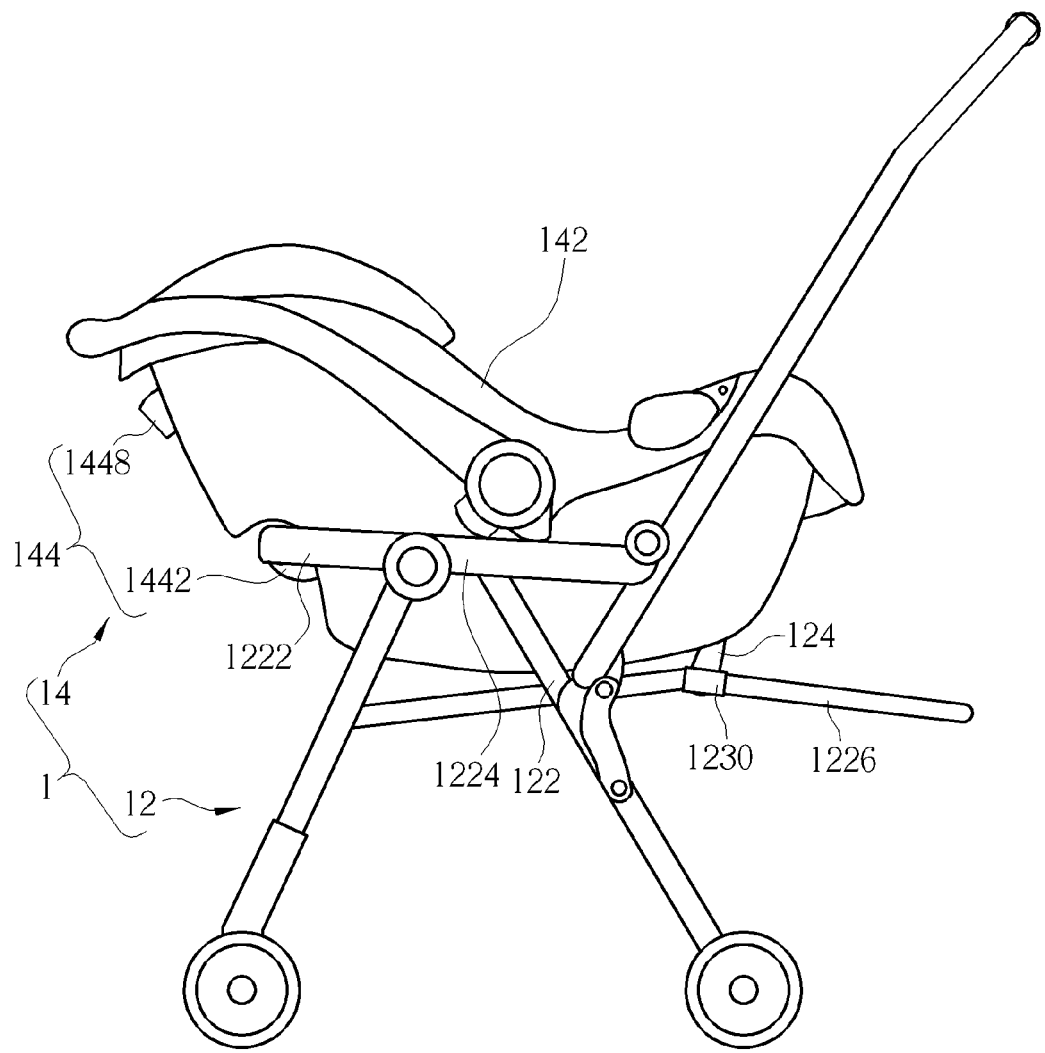
FIG. 1 is a side view of a child stroller of a preferred embodiment according to the invention.
Figure 2:
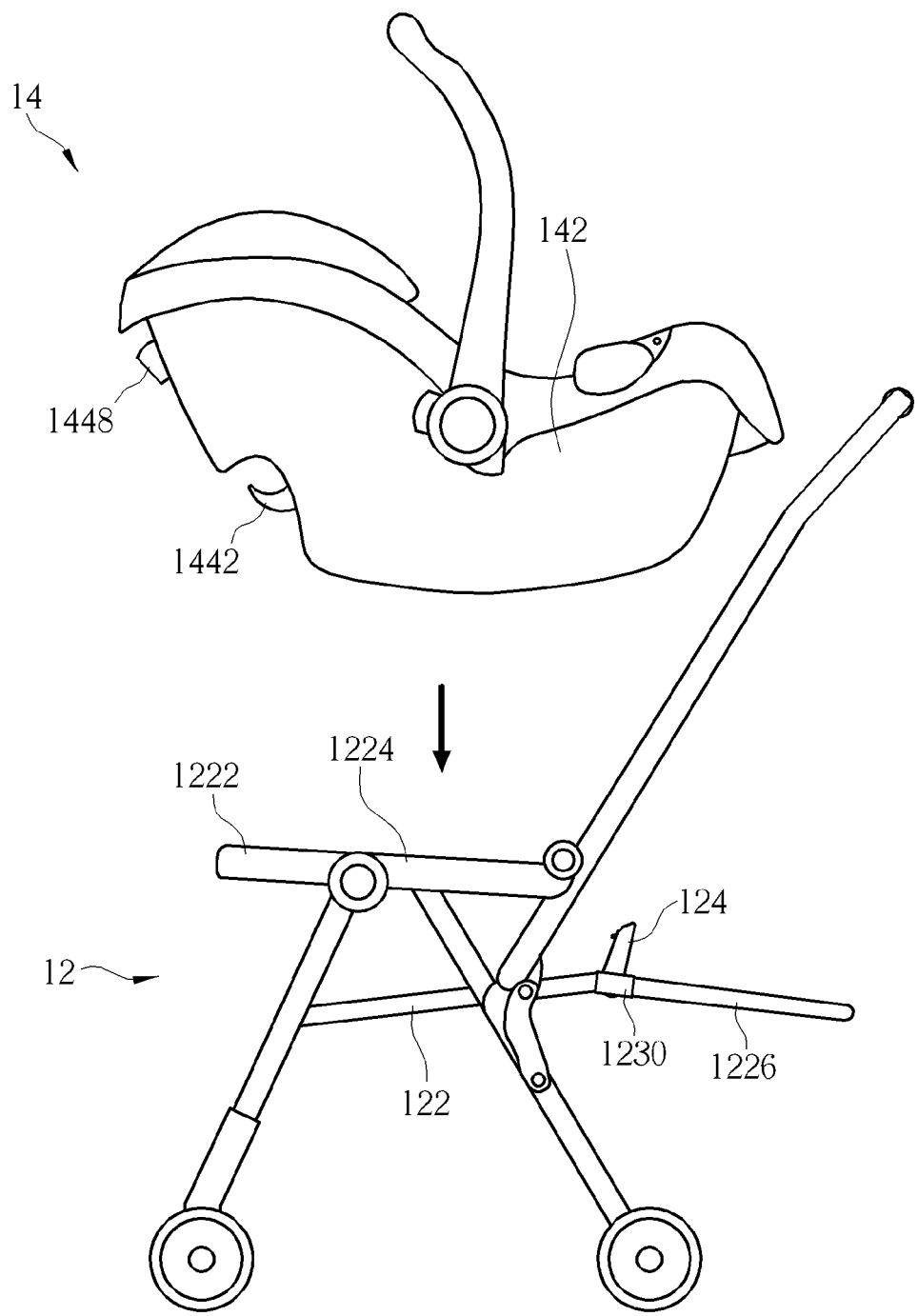
FIG. 2 is a partially exploded view of the child stroller in FIG. 1.

Please refer to FIG. 1 and FIG. 2. FIG. 1 is a side view of a child stroller 1 of a preferred embodiment according to the invention. FIG. 2 is a partially exploded view of the child stroller 1. The child stroller 1 includes a stroller frame 12 and a child safety seat 14. The child safety seat 14 is engaged with the stroller frame 12 in a detachable way. Therefore, in use, the child safety seat 14 can be moved directly to reduce the probability of waking the child sitting thereon up and the inconvenience of parents.

Figure 3:
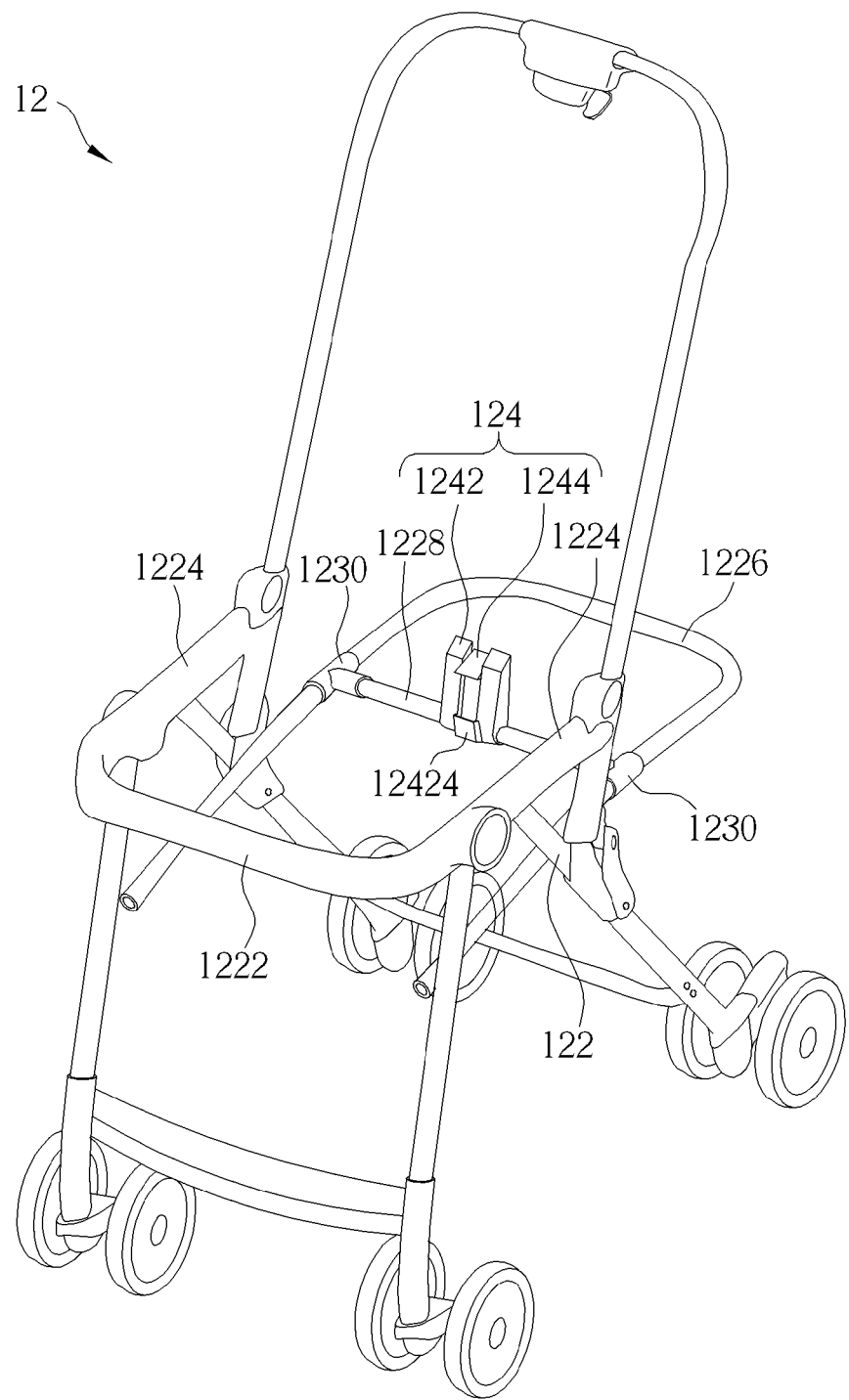
FIG. 3 is a schematic diagram illustrating a stroller frame of the child stroller in FIG. 1.

Further, please refer to FIG. 3, which is a schematic diagram illustrating the stroller frame 12. The stroller frame 12 includes a main frame 122 and an engaging device 124 disposed on the main frame 122. The main frame 122 includes a front handrail support 1222, two side handrail supports 1224, a connection support 1226, a cross bar 1228, and two support joints 1230. The side handrail supports 1224 are oppositely connected to the front handrail support 1222. Two ends of the cross bar 1228 are pivotally connected to the connection support 1226 through the support joints 1230 respectively. The engaging device 124 is disposed on the cross bar 1228.

Figure 4:
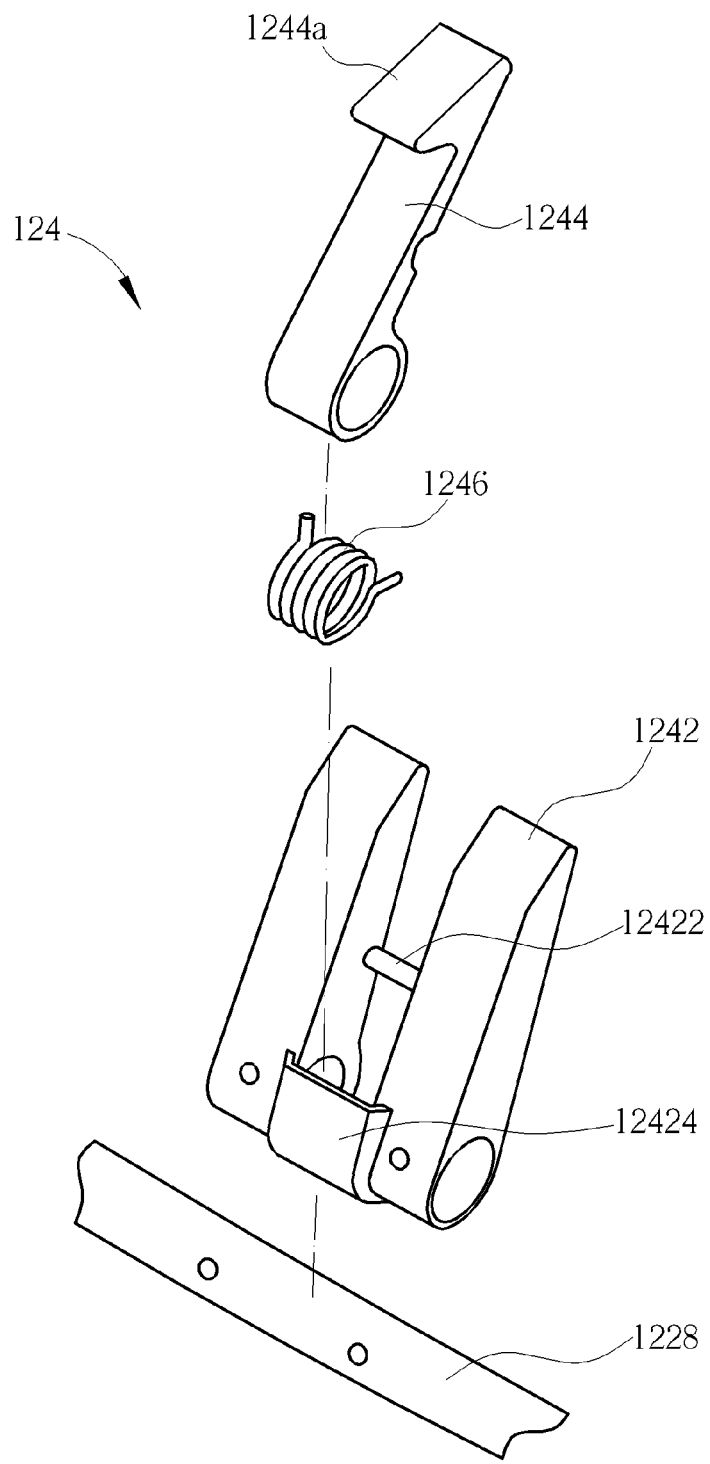
FIG. 4 is an exploded view of an engaging device of the stroller frame in FIG. 3.
Figure 5:
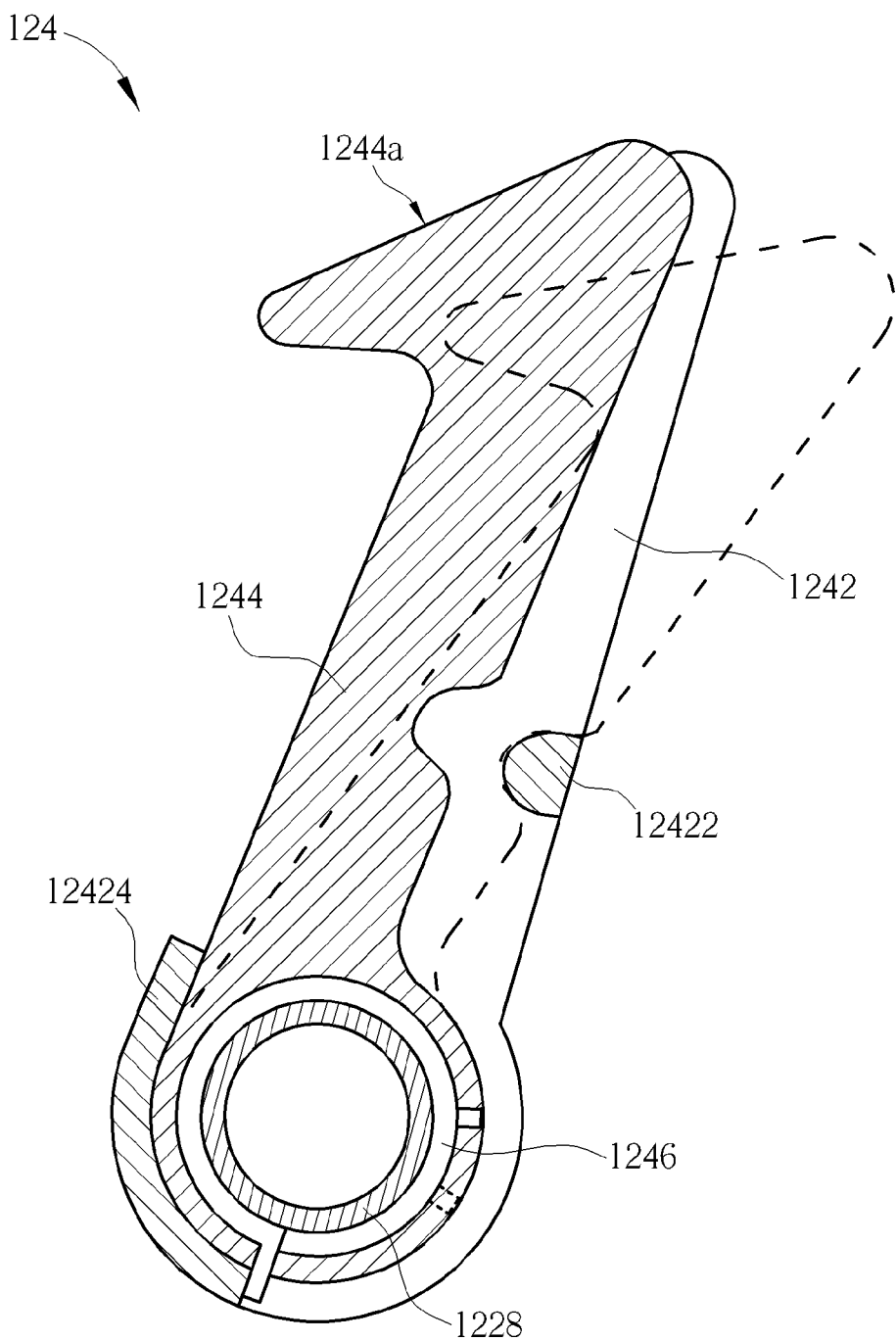
FIG. 5 is a schematic diagram illustrating the action of a hook of the engaging device in FIG. 4.

Please refer to FIG. 4, which is an exploded view of the engaging device 124. The engaging device 124 includes a socket 1242, a hook 1244, and a spring 1246. The cross bar 1228 passes through the socket 1242, the hook 1244, and the spring 1246. The socket 1242 is mounted on the cross bar 1228 by screws or by other fixing methods. The hook 1244 is capable of rotating relative to the cross bar 1228 and the socket 1242. Two ends of the spring 1246 are connected to the socket 1242 and the hook 1244 respectively, so as to provide restoring force when the hook 1244 rotates. Please refer to FIG. 4 and FIG. 5. FIG. 5 is a schematic diagram illustrating the action of the hook 1244 of the engaging device 124; therein, for clear illustration, the engaging device 124 is cut to be shown in FIG. 5, but the spring 1246 is shown in a side view without being cut. The socket 1242 includes a hooking limitation part 12422 and a reset limitation part 12424. In the embodiment, the spring 1246 is pre-compressed to be disposed. Therefore, before the child safety seat 14 is engaged with the stroller frame 12, the hook 1244 tends to rotate counterclockwise under the effect of the restoring force by the spring 1246 but is stopped by the reset limitation part 12424, as shown by solid lines in FIG. 5. When the hook 1244 rotates in a direction (such as rotates clockwise) to hook a rear structural part (i.e. the component 146 in FIG. 6) of the child safety seat 14 under an external force, the hook 1244 further compresses the spring 1246 until being stopped by the hooking limitation part 12422, as shown by dashed lines in FIG. 5. When the external force disappears, the restoring force by the spring 1246 can urge the hook 1244 to rotate in another direction opposite to the direction (i.e. rotate counterclockwise); that is, the hook 1244 rotates away from the hooking limitation part 12422 until being stopped by the reset limitation part 12424, as shown in solid lines in FIG. 5. It is added that constraining the rotation stroke of the hook 1244 by the hooking limitation part 12422 and the reset limitation part 12424 is conducive to the action stability of the engaging device 124; however, the invention is not thereto. For example, in practice, the hook 1244 can rotate clockwise to get inside the socket 1242 completely so as to stop rotating because the external force cannot push the hook 1244 further. The hooking limitation part 12422 therefore can be omitted.

Figure 6:
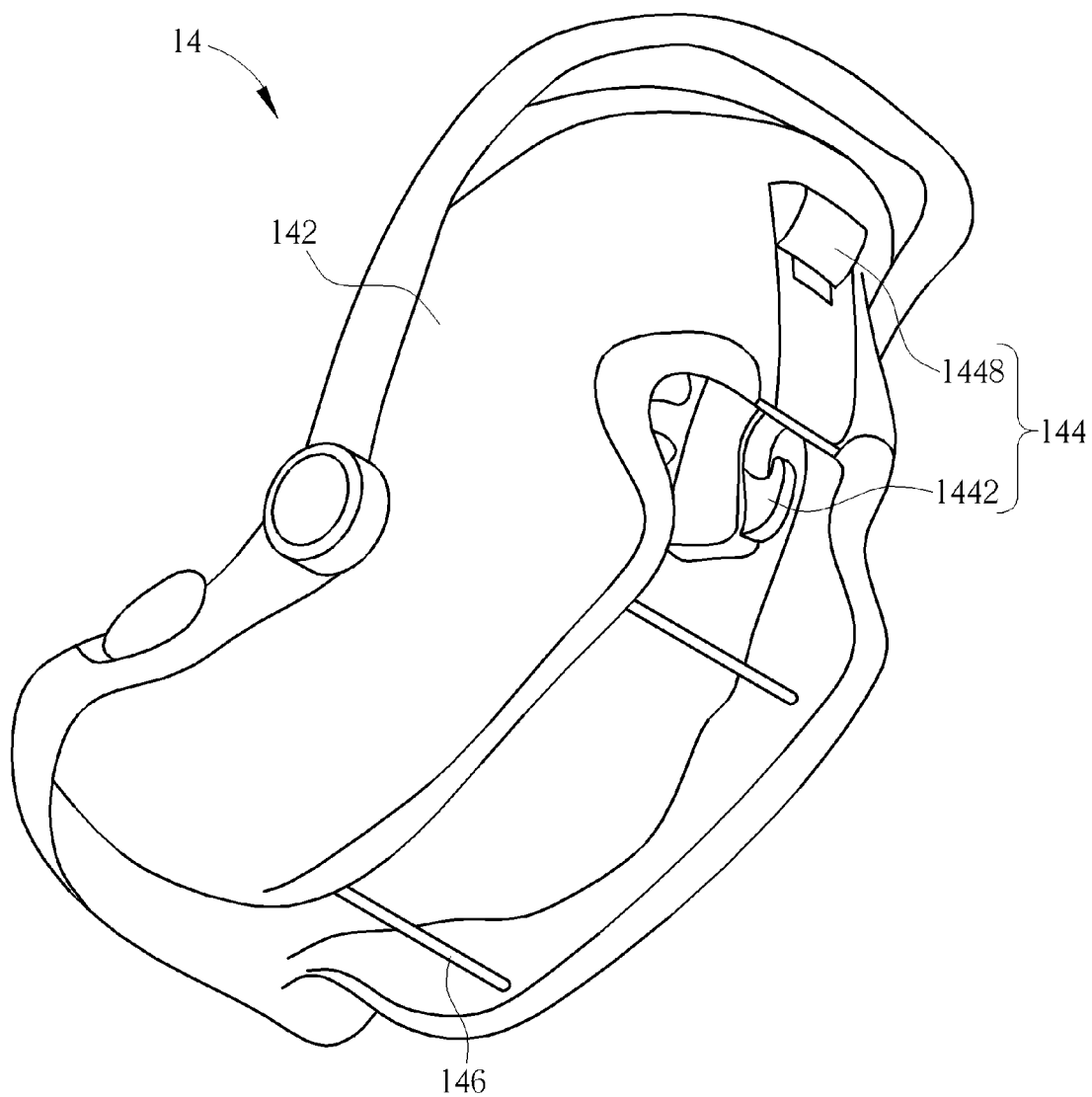
FIG. 6 is a schematic diagram illustrating a child safety seat of the child stroller in FIG. 1.
Figure 7:
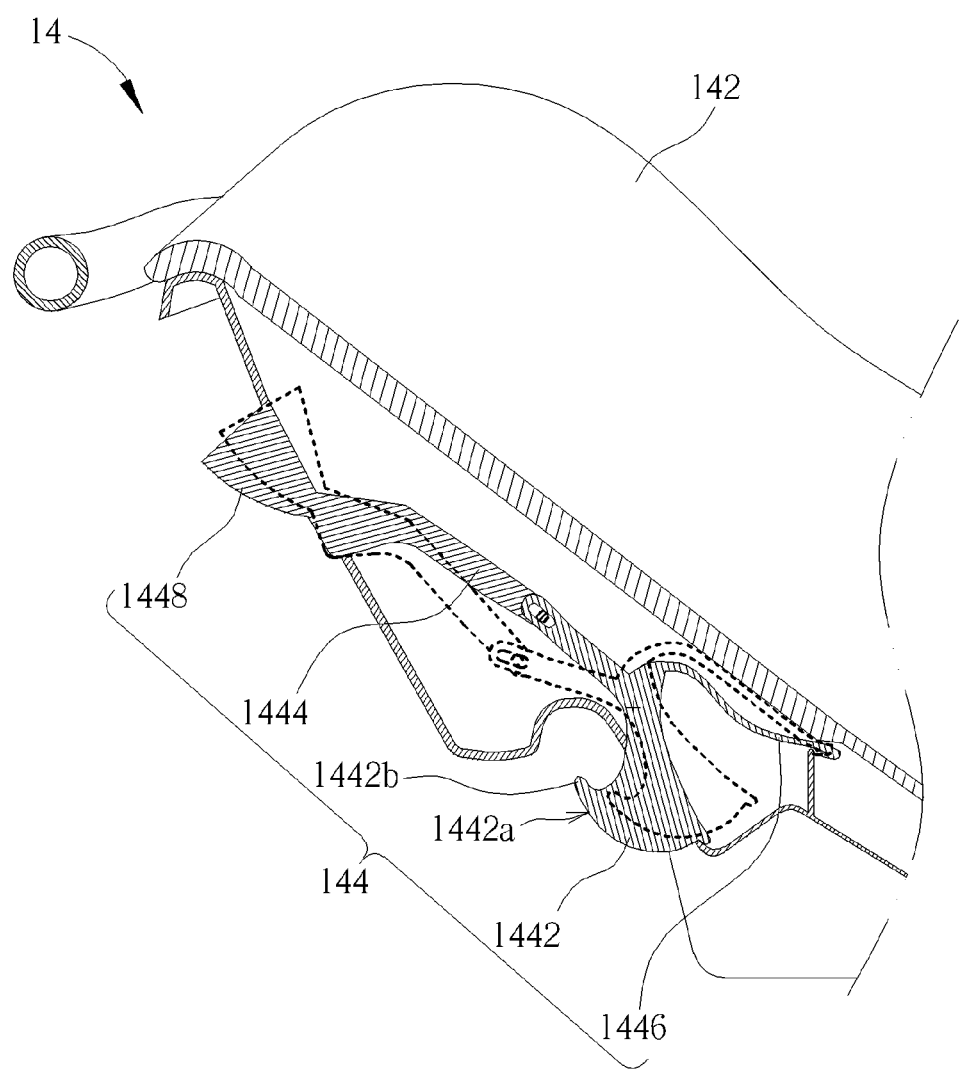
FIG. 7 is a schematic diagram illustrating the action of a front engagement mechanism of the child safety seat in FIG. 6.

Please refer to FIG. 6, which is a schematic diagram illustrating the child safety seat 14. The child safety seat 14 includes a main body 142, a front engagement mechanism 144, and a rear structural part 146. The front engagement mechanism 144 and the rear structural part 146 are disposed on the main body 142. Please refer to FIG. 6 and FIG. 7. FIG. 7 is a schematic diagram illustrating the action of the front engagement mechanism 144 of the child safety seat 14; therein, for clear illustration, the front engagement mechanism 144 is cut to be shown. The front engagement mechanism 144 includes a hook portion 1442, an actuation portion 1444, a reset portion 1446, and a handle 1448. The hook portion 1442 is pivotally connected to the main body 142. The rotation center thereof is indicated by a cross mark in FIG. 7. The actuation portion 1444 connects the hook portion 1442 and the handle 1448. A user can operate the handle 1448 to drive the actuation portion 1444 to rotate the hook portion 1442. An end of the reset portion 1446 is connected to the hook portion 1442; the other end of the reset portion 1446 is urged against an internal structure of the main body 142. When the hook portion 1442 rotates counterclockwise, the reset portion 1446 deforms elastically, as shown in dashed lines in FIG. 7. Afterwards, when the actuation portion 1444 no longer forces the hook portion 1442 to rotate, the hook portion 1442 is rotated clockwise back to the original position by the elastic force induced by the elastic deformation of the reset portion 1446.

Figure 8:
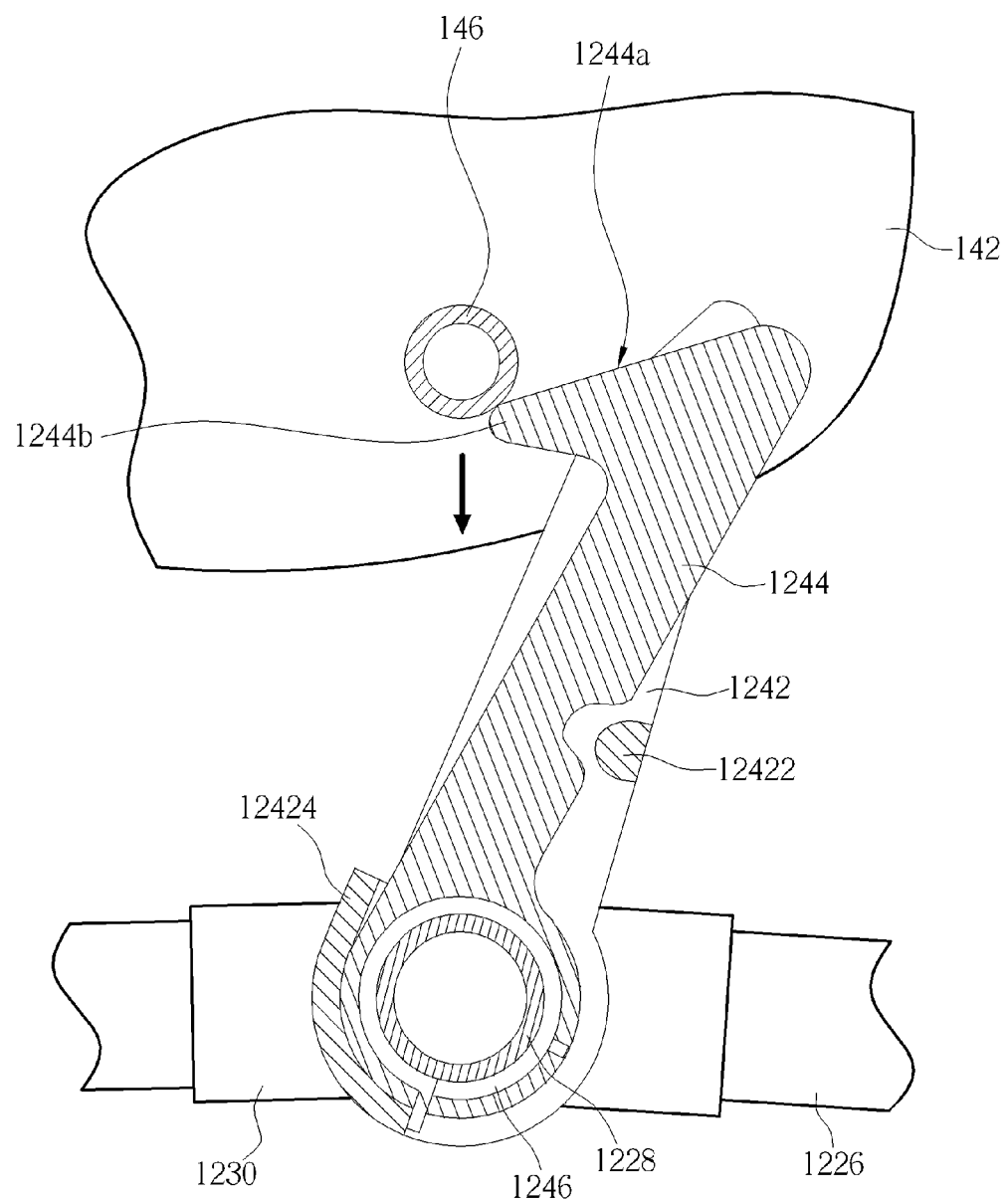
FIG. 8 and FIG. 9 are schematic diagrams illustrating engagement of a rear structural part of the child safety seat with the engaging device of the stroller frame.
Figure 9:
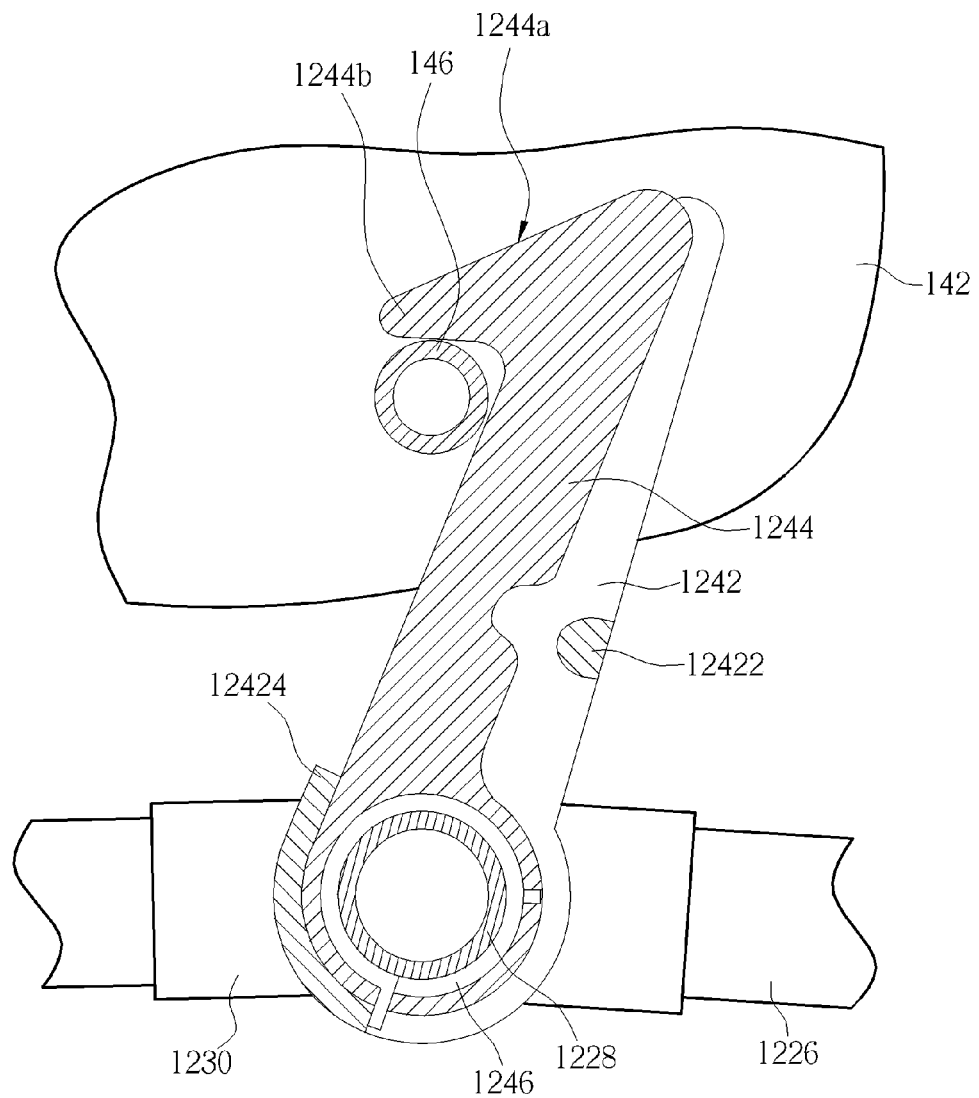

Please refer to FIG. 8 and FIG. 9. FIG. 8 and FIG. 9 are schematic diagrams illustrating engagement of the rear structural part 146 of the child safety seat 14 with the engaging device 124 of the stroller frame 12 when the child safety seat 14 is placed on the stroller frame 12; therein, the rear structural part 146 and the engaging device 124 are cut to be shown, but the spring 1246 is shown in a side view without being cut. The hook 1244 has a guiding surface 1244a. When the child safety seat 14 is placed down to the stroller frame 12 from the above the stroller frame 12, the rear structural part 146 contacts the hook 1244 first and pushes the hook 1244 by the guiding surface 1244a, so that the hook 1244 rotates clockwise about the cross bar 1228 to compress the spring 1246 until the hook 1244 is stopped by the hooking limitation part 12422 or the rear structural part 146 slides over a front end 1244b of the hook 1244, as shown in FIG. 8. Then, the rear structural part 146 keeps moving downward until the child safety seat 14 is placed on the stroller frame 12. At the moment, the hook 1244 returns under the restoring force of the spring 1246 to hook the rear structural part 146 by the front end 1244b, as shown in FIG. 9. It is added that, in the embodiment, the rear structural part 146 is a cross bar, but the invention is not limited thereto. In principle, any structure member of the child safety seat 14 capable of being engaged with the engaging device 124 is applicable to the invention.

Figure 10:
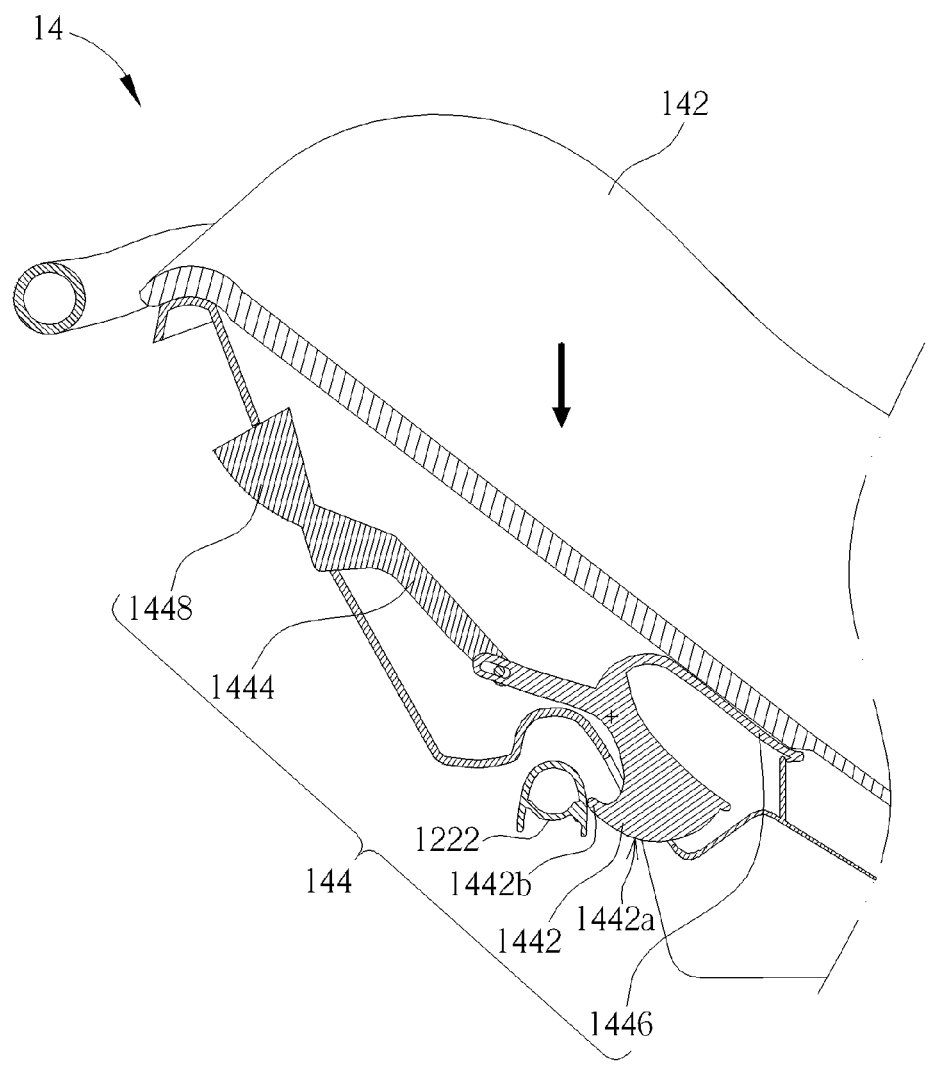
FIG. 10 and FIG. 11 are schematic diagrams illustrating engagement of a front engagement mechanism of the child safety seat with a front handrail support of the stroller frame in FIG. 1.
Figure 11:
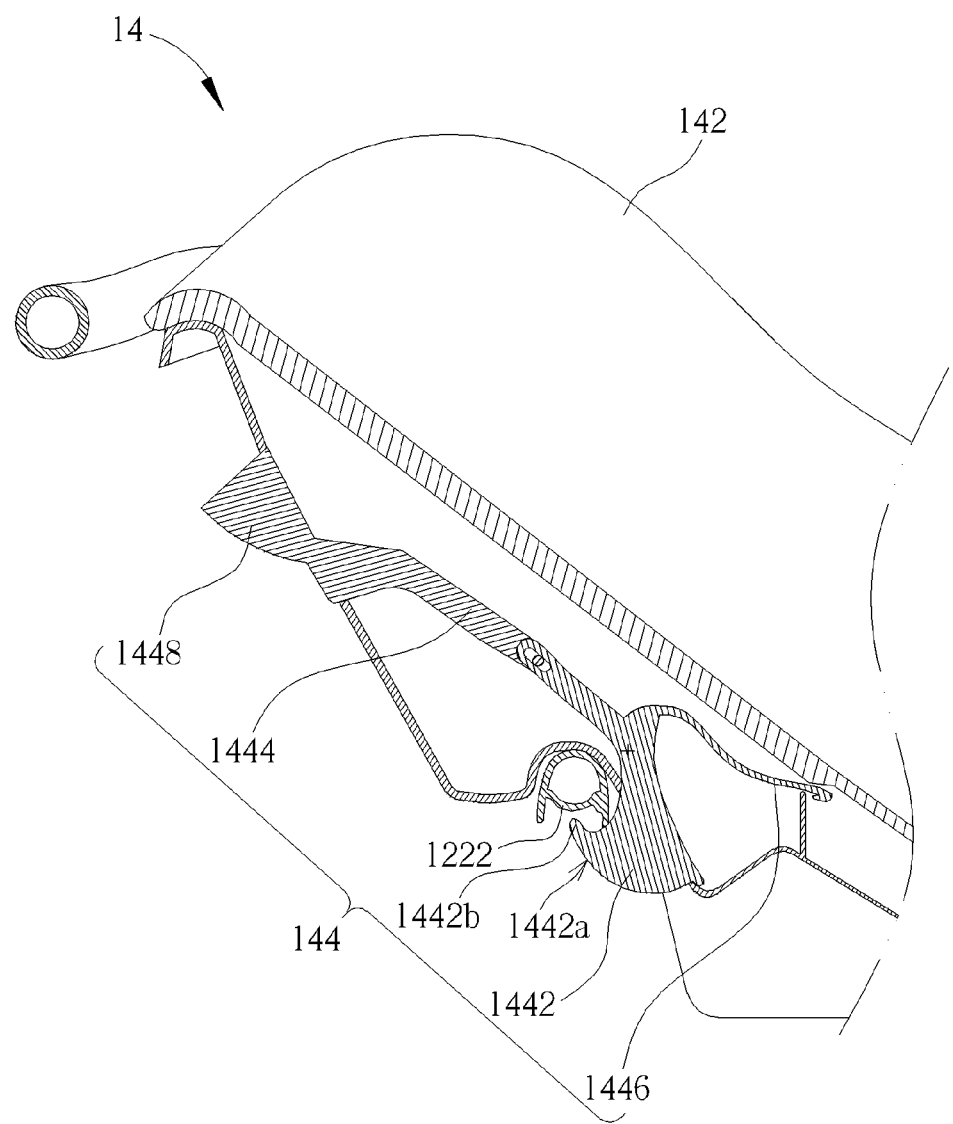

Please refer to FIG. 10 and FIG. 11. FIG. 10 and FIG. 11 are schematic diagrams illustrating engagement of the front engagement mechanism 144 of the child safety seat 14 with the front handrail support 1222 of the stroller frame 12 when the child safety seat 14 is placed on the stroller frame 12; therein, the front engagement mechanism 144 and the front handrail support 1222 are cut to be shown. The hook portion 1442 has a cambered surface 1442a. When the child safety seat 14 is placed down to the stroller frame 12 from the above the stroller frame 12, the hook portion 1442 contacts the front handrail support 1222 first and is pushed by the front handrail support 1222 under the guidance effect of the cambered surface 1442a to rotate until a front end 1442b of the hook portion 1442 slides over the front handrail support 1222, as shown in FIG. 10. Then the front engagement mechanism 144 keeps moving downward until the child safety seat 14 is placed on the stroller frame 12. At the moment, the hook portion 1442 rotates clockwise back to the original position under the restoring force of the reset portion 1446 and hooks the front handrail support 1222, as shown in FIG. 11.

After the front engagement mechanism 144 and the rear structural part 146 of the child safety seat 14 are engaged with the front handrail support 1222 and the engaging device 124 of the stroller frame 12, the child safety seat 14 is therefore supported on the stroller frame 12 stably so as to form the child stroller 1 for use.

In the embodiment, the child safety seat 14 is placed simultaneously on the front handrail support 1222 and the side handrail supports 1224. Therefore, the front handrail support 1222 has functions of supporting and preventing disengaging to the child safety seat 14, while the engaging device 124 has a function only of preventing disengaging to the child safety seat 14; however, the invention is not limited thereto.

Figure 12:
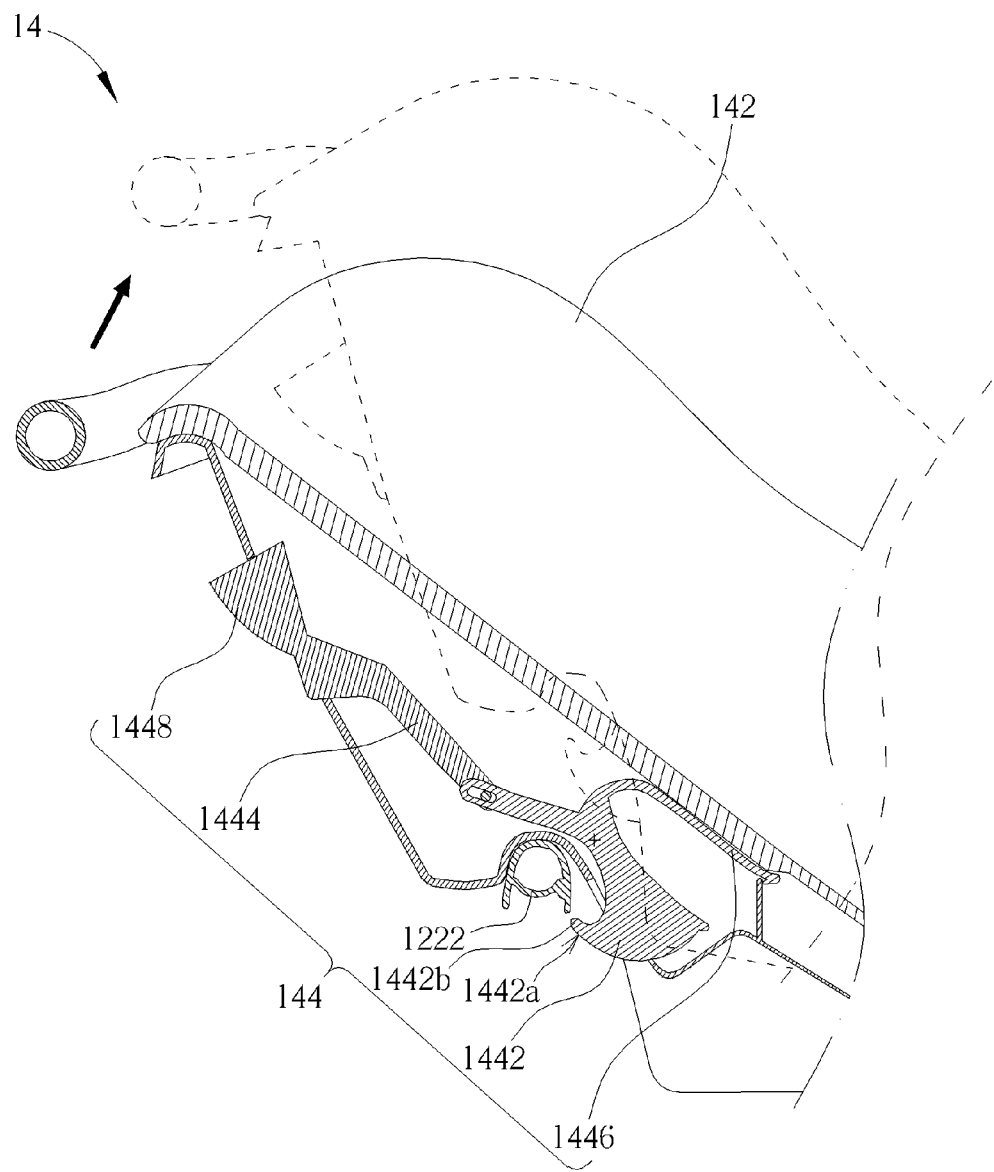
FIG. 12 is a schematic diagram illustrating operation of disengaging the front engagement mechanism of the child safety seat from the front handrail support of the stroller frame in FIG. 1.

Please refer to FIG. 7 and FIG. 12. FIG. 12 is a schematic diagram illustrating operation of disengaging the front engagement mechanism 144 of the child safety seat 14 from the front handrail support 1222 of the stroller frame 12 when the child safety seat 14 is disengaged from the stroller frame 12; therein, the front engagement mechanism 144 and the front handrail support 1222 are cut to be shown. If the child safety seat 14 is required to be disengaged from the stroller frame 12, the user can operate the handle 1448 to drive the actuation portion 1444 to rotate counterclockwise the hook portion 1442 such that the hook portion 1442 no longer hooks the front handrail support 1222, as shown by solid lines in FIG. 12. Then, the child safety seat 14 can be obliquely lifted up so as to disengage the front engagement mechanism 144 from the front handrail support 1222 completely, as shown by dashed lines in FIG. 12; therein, the direction of the obliquely lifting is indicated by a bold line with an arrow. At the moment, the child safety seat 14 is disposed at a slope angle of 5 degrees, and the engaging device 124 is still engaged with the rear structural part 146.

Figure 13:
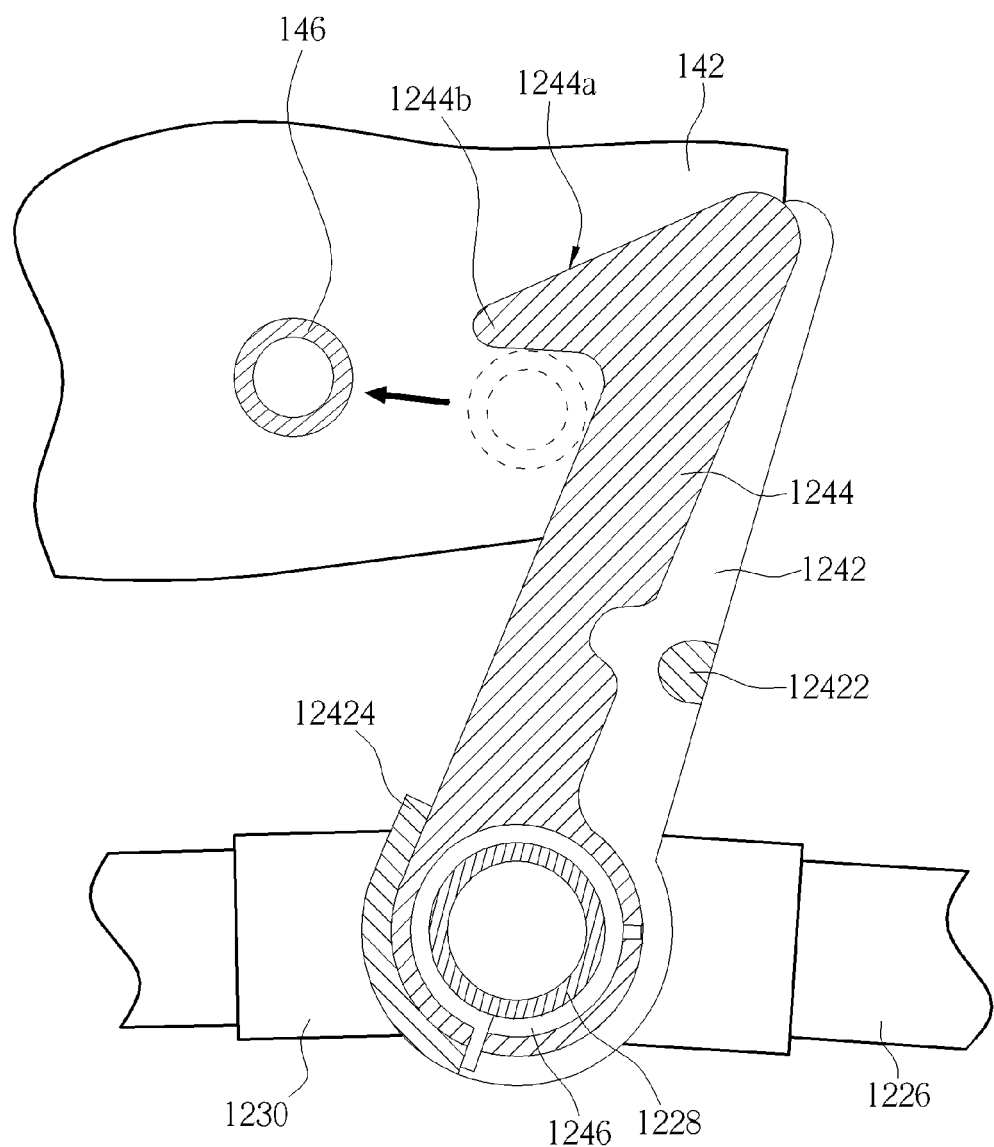
FIG. 13 is a schematic diagram illustrating operation of disengaging the rear structural part of the child safety seat from the engaging device of the stroller frame in FIG. 1.

Please refer to FIG. 13, which is a schematic diagram illustrating operation of disengaging the rear structural part 146 of the child safety seat 14 from the engaging device 124 of the stroller frame 12 when the child safety seat 14 is disengaged from the stroller frame 12; therein, the rear structural part 146 and the engaging device 124 are cut to be shown, but the spring 1246 is shown in a side view without being cut. Afterward, the user can keep obliquely lifting the child safety seat 14 along the slope angle of 5 degrees, so that the rear structural part 146 is disengaged from the engaging device 124. Therein, the position of the rear structural part 146 when disengaged with the engaging device 124 is shown by dashed lines in FIG. 13, and the direction of the obliquely lifting is indicated by a bold line with an arrow. At the moment, the child safety seat 14 is disengaged from the stroller frame 12 completely and then is able to be disposed on a rear seat of a car as a car safety seat, which is not described in addition.

Figure 14:
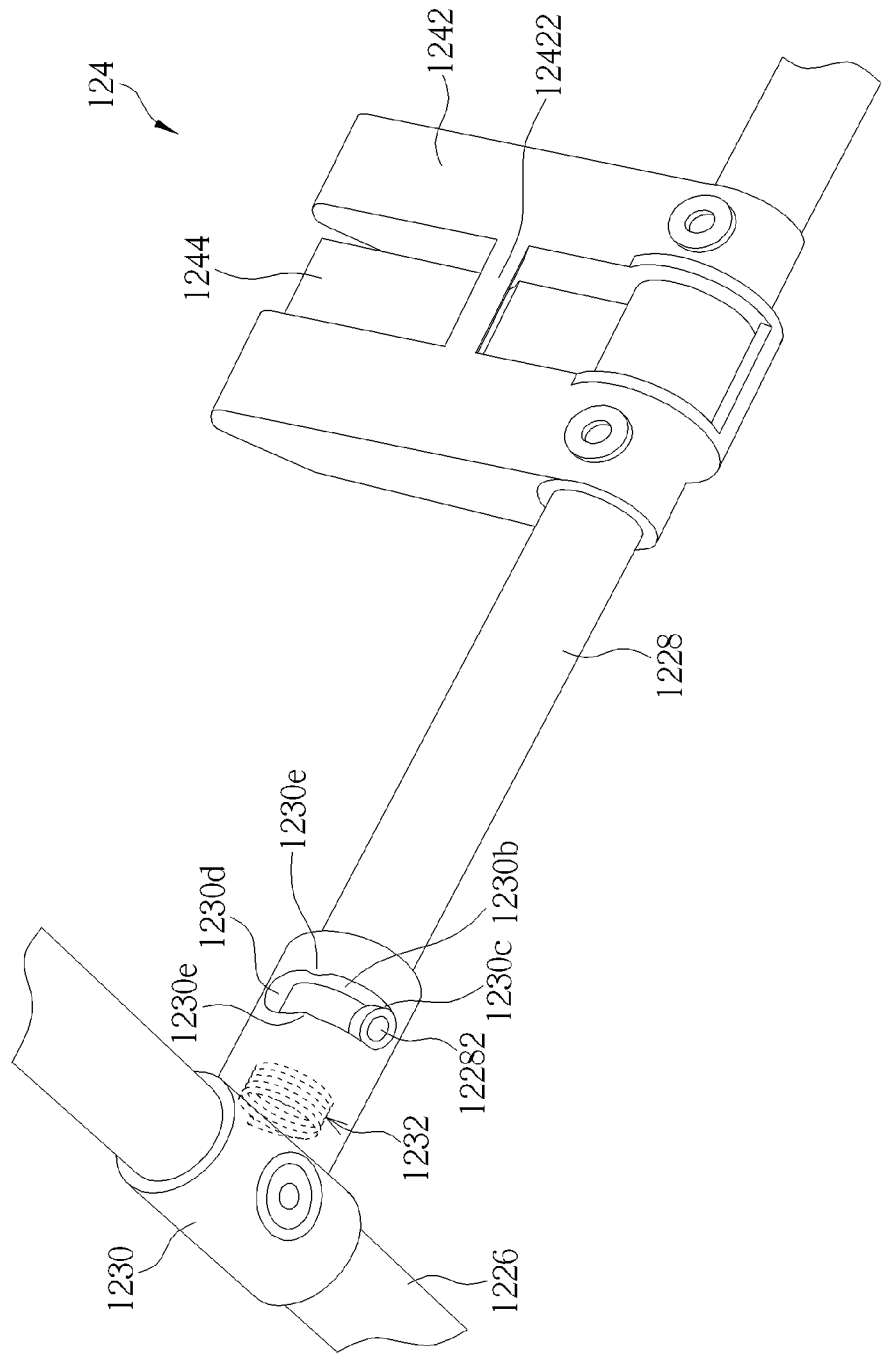
FIG. 14 is an enlarged view of the stroller frame at a support joint in FIG. 3.
Figure 15:
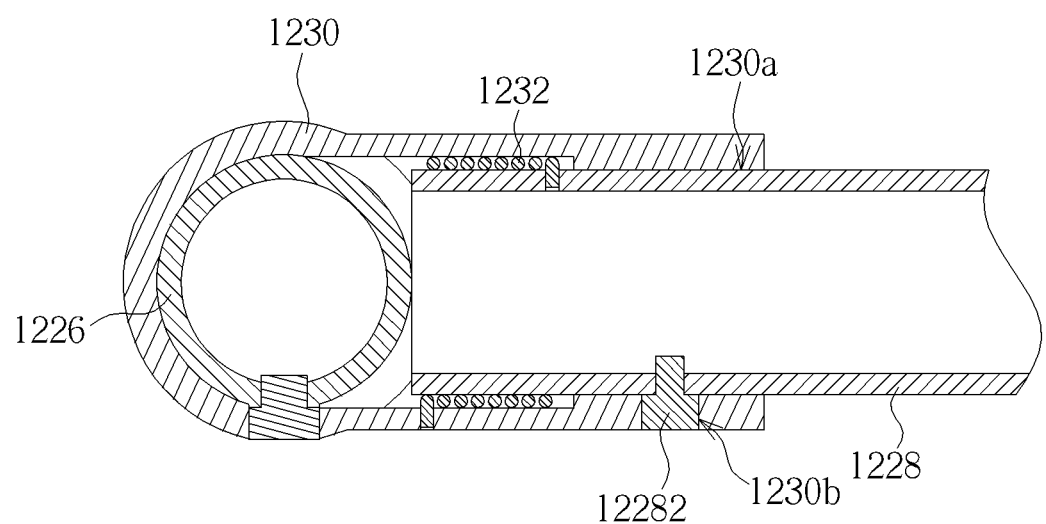
FIG. 15 is a sectional view of the stroller frame at the support joint in FIG. 14.

Please refer to FIG. 14 and FIG. 15. FIG. 14 is an enlarged view of the stroller frame 12 at the support joint 1230, whose view point is located at the rear of the stroller frame 12; therein, the spring 1246 is not shown for simple drawing. FIG. 15 is a sectional view of the stroller frame 12 at the support joint 1230. In the embodiment, the support joint 1230 is mounted on the connection support 1226 and has a pivotal connection hole 1230a and a limitation slot 1230b. The crossbar 1228 includes a guided boss 12282. The cross bar 1228 is rotatably inserted into the pivotal connection hole 1230a and the guided boss 12282 is movably disposed in the limitation slot 1230b. In practice, the pivotal connection of the cross bar 1228 with the connection support 1226 also can be obtained by other methods, so that the engaging device 124 is capable of rotating relative to the connection support 1226. The invention is not limited to the abovementioned pivotal connection structure.

Figure 16:
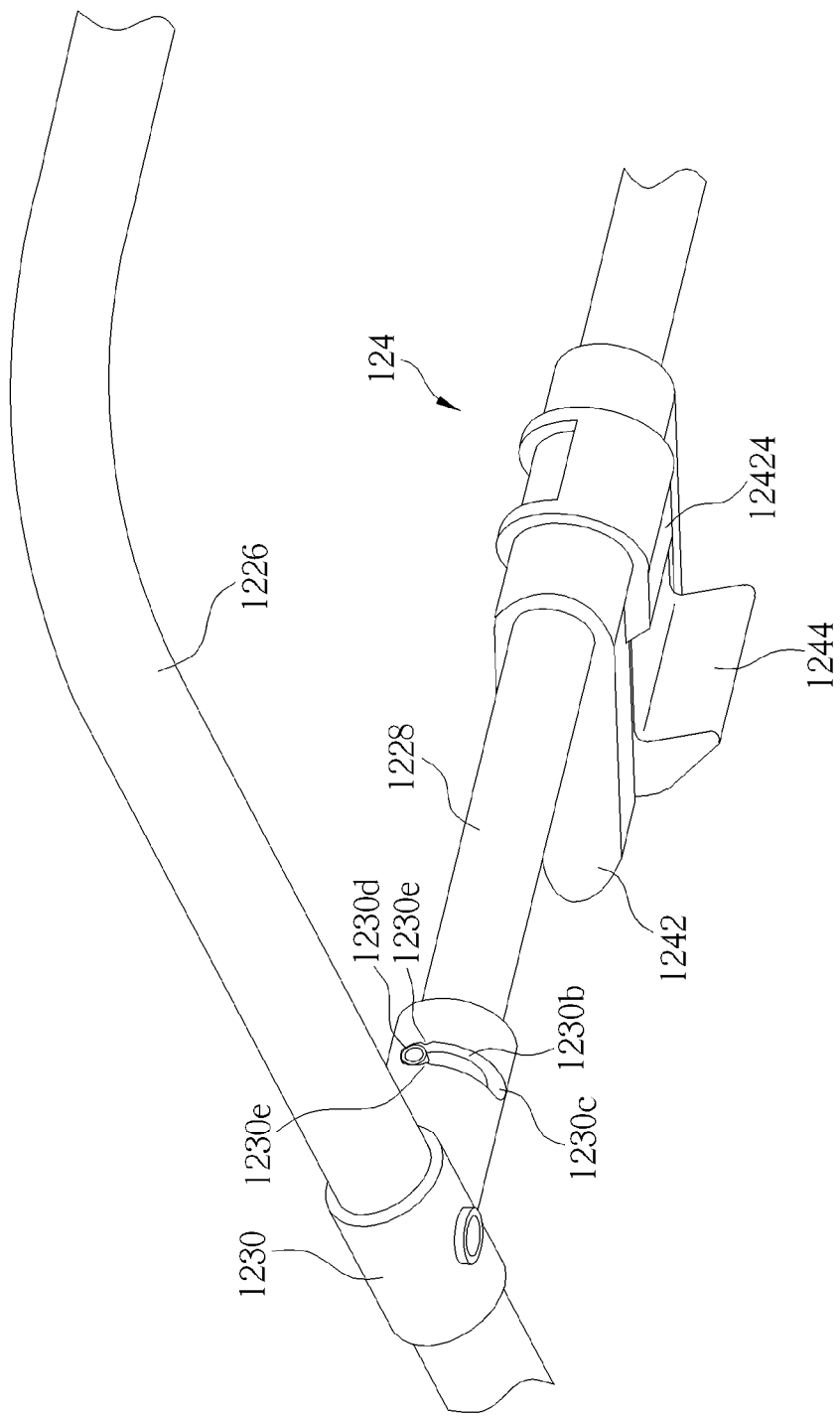
FIG. 16 is a schematic diagram illustrating that the engaging device in FIG. 14 is at a storage state.

In the embodiment, the guided boss 12282 is constrained by the limitation slot 1230b in length, so the cross bar 1228 is capable of rotating relative to the support joint 1230 within a certain range of degrees. When the engaging device 124 rotates together with the cross bar 1228 so that the guided boss 12282 moves to an end portion 1230c of the limitation slot 1230b, the engaging device 124 is at a use state so that the hook 1244 is capable of hooking the rear structural part 146, as shown by FIG. 14. Please refer to FIG. 14 and FIG. 16. FIG. 16 is a schematic diagram illustrating that the engaging device 124 is at a storage state. When the stroller frame 12 is required to be folded, the user can rotate the engaging device 124 together with the cross bar 1228 so that the guided boss 12282 moves to a second end portion 1230d of the limitation slot 1230b. Therefore, the engaging device 124 is at the storage state so that the engaging device 124 and the connection support 1226 are folded, which is conducive to the fold of the stroller frame 12. In order to keep the engaging device 124 in the storage state during the fold of the stroller frame 12, the limitation slot 1230b has a couple of lock protrusions 1230e at the second end portion 1230d for holding the guided boss 12282 of the cross bar 1228 close to the end portion 1230d, that is to indirectly prevent the engaging device 124 from rotating.

In addition, please refer to FIG. 14, FIG. 15 and FIG. 16. In the embodiment, the main frame 122 further includes a spring 1232 for each support joint 1230. The disposition position of the spring 1232 is indicated by dashed lines in FIG. 14. Two ends of the spring 1232 are held by the cross bar 1228 and the support joint 1230 respectively, as shown in FIG. 15. The details of the installation of the spring 1232 is no longer described herein and can be easily achieved by skilled people in the art. The limitation slot 1230b has no structure of lock protrusion at the first end portion 1230c, so in order to keep the engaging device 124 at the use state more stably, the spring 1232 can be disposed with elastical deformation in advance so as to urge the guided boss 12282 to stop at the first end portion 1230c. Besides, when the cross bar 1228 rotates relative to the support joint 1230 so that the guided boss 12282 is held by the lock protrusions 1230e to stop at the second end portion 1230d, the cross bar 1228 urges the spring 1232 to further elastically deform to induce a larger restoring force. Therefore, if the user needs to use the engaging device 124, such as after the folded stroller frame 12 is unfolded, the user just needs to poke the engaging device 124 so as to overcome the holding force by the lock protrusions 1230e. The restoring force induced by the spring 1232 can urge the cross bar 1228 to rotate so that the guided boss 12282 moves the first end portion 1230c and keeps stopping at the first end portion 1230c. The engaging device 124 is therefore at the use state.

It is added that the denomination for the front engagement mechanism 144 and the rear structural part 146 is in accordance with the orientation of the stroller frame 12, which facilitates reading this specification. The denomination is not for implying the disposition thereof relative to the orientation of the child safety seat 14. For example, an engagement mechanism of a common carrier safety seat corresponding to the front engagement mechanism 144 of the invention is usually disposed at the rear of the carrier safety seat. In the embodiment, the child safety seat 14 is a carrier safety seat, but the invention is not limited thereto.

As discussed above, the invention uses the stroller frame and the child safety seat to form the child stroller. The child safety seat is engaged with the stroller frame in a detachable way. Therefore, the child safety seat can function as not only a safety seat on a rear car of a car and but also the seat of the child stroller, which save the expenses of buying a child safety seat and a child stroller respectively for the parents. If a movement of a child sitting on the child safety seat disposed on the rear seat of the car is required, the child together with the child safety seat can be moved onto the stroller frame, which reduces the probability of waking the child up and solves the problem in the prior art that carrying the child up for the movement of the child usually wakes the child up. Furthermore, the child safety seat engaged with the stroller frame can form the child stroller of the invention, which facilitates movement of the child stroller by the parents. The combination of the child stroller of the invention is not limited to that of the child safety seat with the stroller frame as discussed above. A seat portion of an infant sleep carriage or a child high chair may be applicable to the child safety seat. In other words, any movable seat carrier for child capable of being installed on the stroller frame of the invention is applicable to the combination of the invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A stroller frame capable of being engaged with a child safety seat, the child safety seat comprising a rear structural part, the stroller frame comprising:
a main frame, comprising a front handrail support; and
an engaging device disposed on the main frame, the engaging device comprising a hook capable of rotating in a direction to hook the rear structural part, a socket mounted on the main frame, and a spring connected to the socket and the hook respectively for urging the hook to rotate in another direction opposite to the direction, when the child safety seat is placed on the stroller frame, the front handrail support supporting the child safety seat and the hook hooking the rear structural part.

2. The stroller frame of claim 1, wherein the socket comprises a hooking limitation part, and the hook is capable of rotating relative to the socket and being stopped by the hooking limitation part.

3. The stroller frame of claim 1, wherein the socket comprises a reset limitation part, and the spring urges the hook to rotate in the another direction until being stopped by the reset limitation part.

4. The stroller frame of claim 1, wherein the child safety seat comprises a front engagement mechanism, the hook has a guiding surface, and when the child safety seat is placed on the stroller frame, the front engagement mechanism is engaged with the front handrail support, the rear structural part pushes the hook by the guiding surface, and then the hook returns to hook the rear structural part.

5. The stroller frame of claim 1, wherein the main frame comprises a connection support and a cross bar, the cross bar is connected to and between the connection support, and the engaging device is disposed on the cross bar and capable of rotating relative to the connection support.

6. The stroller frame of claim 5, wherein the main frame comprises a support joint mounted on the connection support, the support joint has a pivotal connection hole and a limitation slot, the cross bar has a guided boss, the cross bar is rotatably inserted in the pivotal connection hole, and the guided boss is movably disposed in the limitation slot.

7. The stroller frame of claim 6, wherein the engaging device is fixedly connected to the cross bar, when the engaging device together with the cross bar rotate so that the guided boss moves to a first end portion of the limitation slot, the engaging device is at a use state so that the hook is capable of hooking the rear structural part, and when the engaging device together with the cross bar rotate so that the guided boss moves to a second end portion of the limitation slot, the engaging device is at a storage state so that the engaging device and the connection support are folded.

8. The stroller frame of claim 7, wherein the limitation slot has a lock protrusion at the second end portion, the main frame comprises a spring connected to the support joint and the cross bar respectively, and when the guided boss moves to the second end portion and is held by the lock protrusion, the spring of the main frame deforms elastically.

9. A child stroller, comprising:
a stroller frame, comprising:
a main frame, comprising a front handrail support; and
an engaging device disposed on the main frame, the engaging device comprising a socket mounted on the main frame, and a hook having a guiding surface, the socket comprising a hooking limitation part, the hook being capable of rotating relative to the socket and being stopped by the hooking limitation part, the stroller frame being capable of supporting and engaging with a child carrier in a detachable way, the child carrier comprising a rear structural part, wherein the hook is adapted to be pushed to move through the guiding surface by the rear structural part and then return back to hook the rear structural part during the child carrier being placed onto the stroller frame, and when the child carrier is placed on the stroller frame, the front handrail support supports the child carrier.

10. The child stroller of claim 9, wherein the child carrier comprises a front engagement mechanism, the front engagement mechanism is engaged with the front handrail support, and the rear structural part is a cross bar.

11. The child stroller of claim 10, wherein the child carrier comprises a main body, the front engagement mechanism comprises a hook portion and an actuation portion, the hook portion is pivotally connected to the main body for hooking the front handrail support, and the actuation portion is connected to the hook portion for rotating the hook portion.

12. The child stroller of claim 9, wherein the hook is capable of rotating in a direction to hook the child carrier, the engaging device comprises a spring, and the spring is connected to the socket and the hook respectively for urging the hook to rotate in another direction opposite to the direction.

13. The child stroller of claim 9, wherein the main frame comprises a connection support and a cross bar, the cross bar is connected to and between the connection support, and the engaging device is disposed on the cross bar and capable of rotating relative to the connection support.

14. The child stroller of claim 13, wherein the main frame comprises a support joint mounted on the connection support, the support joint has a pivotal connection hole and a limitation slot, the cross bar has a guided boss, the cross bar is rotatably inserted in the pivotal connection hole, and the guided boss is movably disposed in the limitation slot.

15. The child stroller of claim 14, wherein the engaging device is fixedly connected to the cross bar, when the engaging device together with the cross bar rotate so that the guided boss moves to a first end portion of the limitation slot, the engaging device is at a use state so that the hook is capable of hooking the rear structural part, and when the engaging device together with the cross bar rotate so that the guided boss moves to a second end portion of the limitation slot, the engaging device is at a storage state so that the engaging device and the connection support are folded.

16. The child stroller of claim 15, wherein the limitation slot has a lock protrusion at the second end portion, the main frame comprises a spring connected to the support joint and the cross bar respectively, and when the guided boss moves to the second end portion and is held by the lock protrusion, the spring of the main frame deforms elastically.

17. The child stroller of claim 9, wherein the main frame comprises two side handrail supports oppositely connected to the front handrail support, and the child carrier is placed simultaneously on the front handrail support and the side handrail supports.

\* \* \* \* \*